United States Patent [19]

Wallace et al.

[11] 4,400,785
[45] Aug. 23, 1983

[54] MICROPROCESSOR MONITORING SYSTEM FOR FASTENER TIGHTENING

[75] Inventors: William K. Wallace, Barneveld; David A. Giardino, Deerfield; Joseph R. Groshans, Clinton, all of N.Y.

[73] Assignee: Chicago Pneumatic Tool Company, New York, N.Y.

[21] Appl. No.: 215,571

[22] Filed: Dec. 12, 1980

Related U.S. Application Data

[63] Continuation-in-part of Ser. No. 183,424, Sep. 2, 1980.

[51] Int. Cl.³ .................. G06F 15/20; B23P 19/06
[52] U.S. Cl. ................................ 364/508; 73/761; 73/862.24
[58] Field of Search .............. 364/508, 577; 29/240, 29/407; 173/2, 12; 73/761, 763, 862.24, 862.23; 411/190

[56] References Cited

U.S. PATENT DOCUMENTS

| | | | |
|---|---|---|---|
| 4,102,182 | 7/1978 | Brown et al. | 73/862.24 |
| 4,110,829 | 8/1978 | Boys | 364/577 |
| 4,208,775 | 6/1980 | McCombs et al. | 29/240 |
| 4,244,245 | 1/1981 | Wallace et al. | 73/761 |
| 4,280,380 | 7/1981 | Eshghy | 29/407 |
| 4,333,220 | 6/1982 | Aspers | 364/508 |

*Primary Examiner*—Errol A. Krass
*Attorney, Agent, or Firm*—Stephen J. Rudy

[57] ABSTRACT

A method for monitoring torque and angle developed upon a fastener during fastener run-up and setting, which method utilizes successive area measurements under a torque-angle curve, said areas being compared at predetermined torque levels to provide an indication of whether or not the entire assembly operation satisfies established criteria.

Auxiliary means may include tool stopping by automatic shut-off means, or tool stall, and read-out means in the form of a printed record, an alarm signal, e.g., flashing lights or sounding means, as well as marking of a fastener to indicate compliance with predetermined fastener assembly criteria.

5 Claims, 6 Drawing Figures

FORMULA FOR AREA UNDER THE ACTUAL TORQUE TURN CURVE FROM $T_i$ TO $T_{MIN}$.

$$A = [\tfrac{1}{2}\Delta\theta\, T_1''] + [T_1''\Delta\theta + \tfrac{1}{2}\Delta\theta(T_2'' - T_1'')] + [T_2''\Delta\theta + \tfrac{1}{2}\Delta\theta(T_3'' - T_2'')] + [T_3''\Delta\theta + \tfrac{1}{2}\Delta\theta(T_M'' - T_3'')]$$

$$A = \Delta\theta[\tfrac{1}{2}T_1'' + T_1'' + \tfrac{1}{2}T_2'' - \tfrac{1}{2}T_1'' + T_2'' + \tfrac{1}{2}T_3'' - \tfrac{1}{2}T_2'' + T_3'' + \tfrac{1}{2}T_M'' + \tfrac{1}{2}T_3'']$$

$$A = \Delta\theta[T_1'' + T_2'' + T_3'' \ldots\ldots + \tfrac{1}{2}T_M'']$$

NOTE: FOR THE ABOVE FORMULA $T_i$ THRU $T_M$ ARE MEASURED FROM $T_i$ AND NOT $T_0$

MICROPROCESSOR MONITORING SYSTEM FOR FASTENER TIGHTENING

BACKGROUND OF THE INVENTION

This application is a continuation-in-part of our prior application Ser. No. 183,424, filed Sept. 2, 1980, the entire disclosure of said prior application being incorporated by reference herein.

Our prior application disclosed a method of tightening a fastener until yield point was reached, which method utilized successive area measurement under a torque-angle curve generated during fastener run-up and torquing, with the tightening operation being stopped at a predetermined yield point, or under non-acceptable torquing conditions, as indicated by certain area changes.

The subject invention utilizes successive area measurement under a torque-angle curve, however, the method of the invention is concerned with monitoring any given fastener operation from start to finish for determination of acceptability of the fastener assembly. Accordingly, the method of the invention relates to inspection rather than control of a fastener assembly operation. The method does not contemplate any stoppage of the fastener tightening operation, such being accomplished by other means outside the scope of the invention, such as tool stoppage by shut-off control means, or by tool stalling, or any other of the means known and/or practiced in the art.

GENERAL DESCRIPTION OF THE METHOD OF THE INVENTION

The method of the invention successively monitors areas under a torque-angle curve, which areas are proportional to the work developed during a fastener run-up and final tightening of a fastener. Three monitoring steps are involved in a fastener setting operation, as follows:

1. Low Zone Area (work) Rate Change Analysis—The method monitors an initial portion of the cycle, and after a first predetermined torque level is reached, the area under the torque-angle curve is calculated for each degree of rotation. Successive areas are compared with the initial area to determine the rate of work change. Such comparisons, made at pre-set limits, indicate acceptability of the fastener assembly operation. A crossed thread, defective thread, or a misassembled fastener can be thus detected, and indicated.

2. High Zone Area (work) Rate Change Analysis—After a second predetermined torque level is reached, a new reference area is calculated. Each successive area change is calculated and compared with the new reference area to determine rate of work change. Comparison is again made at pre-set limits to determine acceptability of the fastener assembly operation.

3. Final Check—After the tool driving the fastener has been shut off, by automatic shut-off control, tool stalling, etc., the method monitors the final value of torque and angular displacement of the fastener. Both values must be within pre-set limits, including such values in the low and high area zones, for the fastener assembly to be acceptable. Such readings may be indicated on a printout means, an alarm means, i.e., lights, etc., or by means to mark the fastener to indicate acceptability.

DESCRIPTION OF MATHEMATICAL BASIS OF INVENTION

Figure 1:
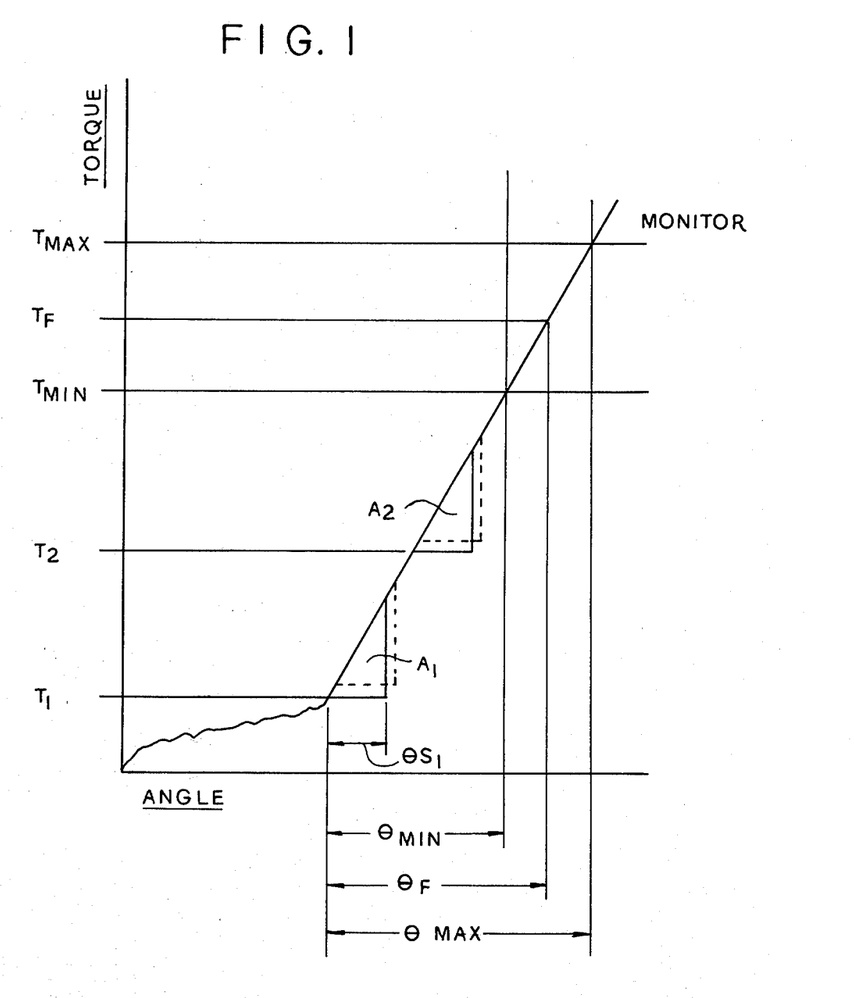
FIGS. 1–4 are torque-angle curves useful in describing the theoretical basis of the invention.

Low Zone Area (work) Rate Change Analysis—refer to FIG. 1.

At the start of the cycle a tool raises the torque level to ($T_1$). This is a predetermined set point for each specific fastener application. Once the torque level ($T_1$) is exceeded, measurement of angular displacement begins and continues until tool shutoff. Level ($T_1$) also initiates the low zone work rate change sensing portion of the cycle.

Although the curve is shown as a straight line after $T_1$, in actuality, the locus of points of the torque vs. angular displacement curve do not form a straight line. The use of instantaneous readings, of arithmetical averages of such points would introduce errors into the calculations. Since the system uses the area under the curve to detect the rate of change of work, such errors are minimized.

Figure 2:
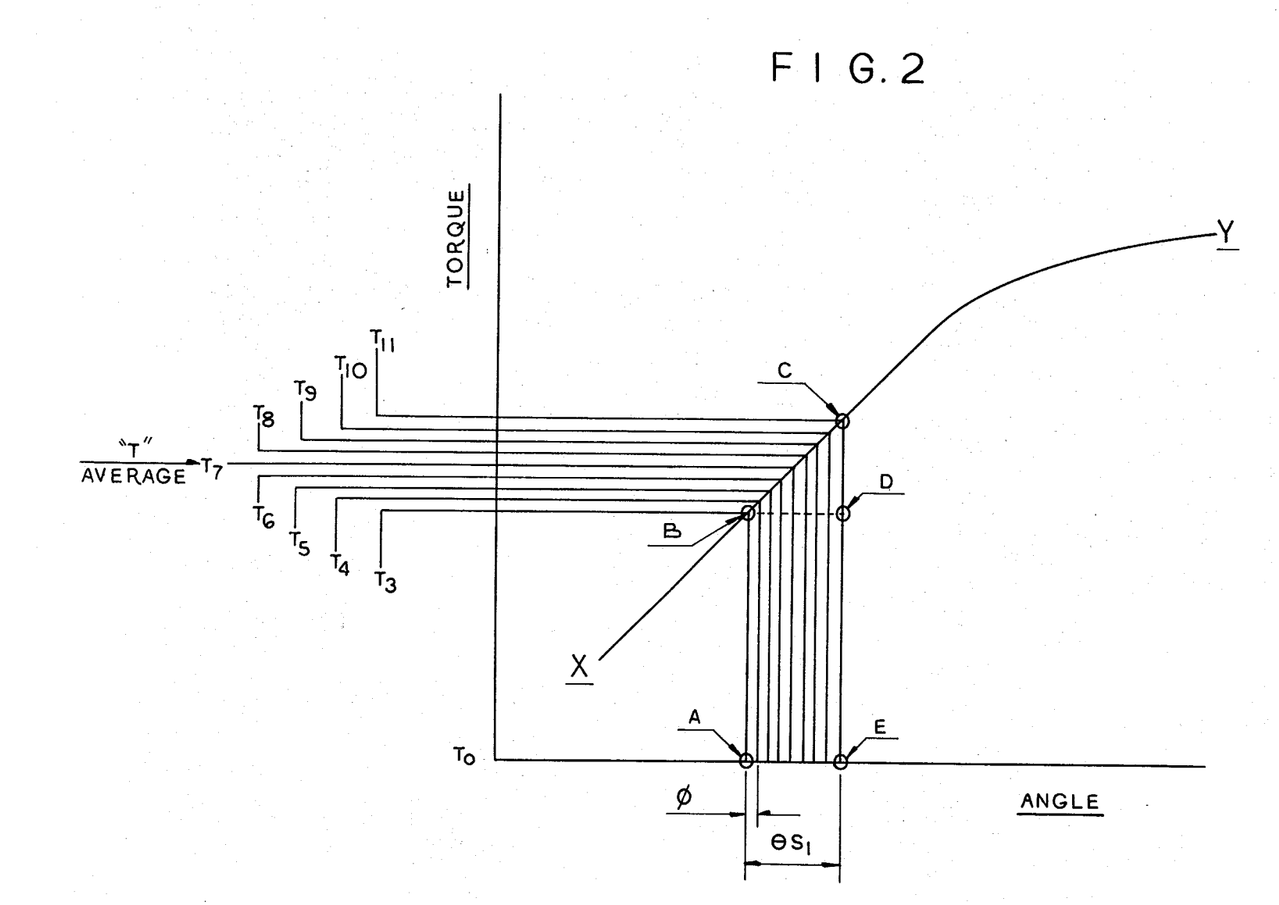

With reference to FIG. 2, the technique of using torque-angle measurements to sense work rate of change from predetermined limits, will now be described.

After level $T_1$ is exceeded the torque value at each unit of angular displacement ($\phi$) is measured over a predetermined angle $\theta_{s1}$.

For illustrative purposes assume a value of 1° for the unit of angular displacement $\phi$ and 8° as the value of $\theta_{s1}$.

As can be seen the area under curve X-Y for the angular distance $\theta_{s1}$ can be represented by the area of the polygon ABCE, and also by the sum of the areas ABDE and BCD. The average torque under the portion of the curve BC is equal to $$T(average) = \Sigma(T_3 \text{ thru } T_{11})/\theta_{s1}$$

Figure 3:
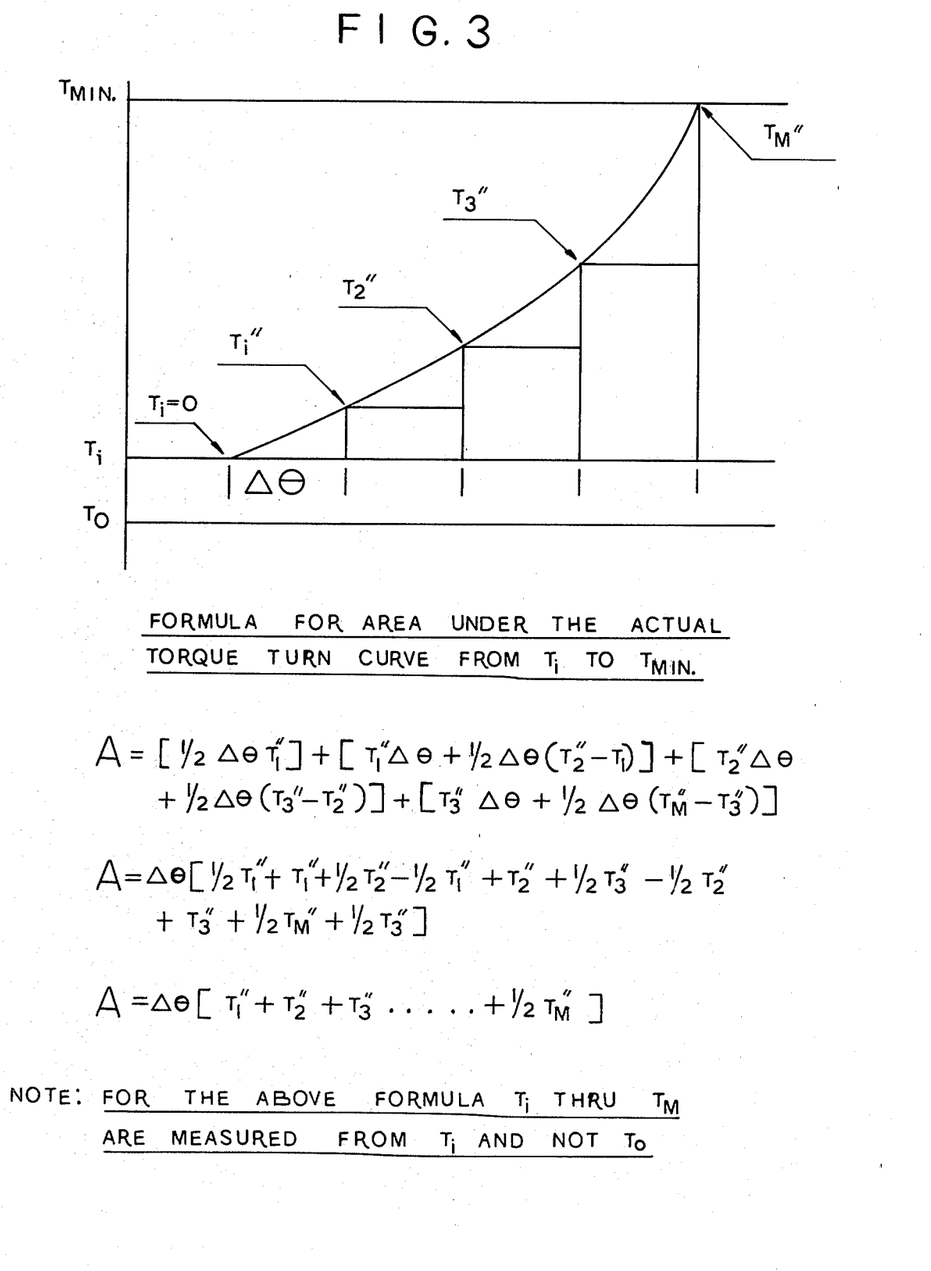

To illustrate that the area under the curve is equal to the sum of the included torques, please refer to FIG. 3. Although the formula $A = \Delta\theta[T_1'' + T_2'' + T_3'' \ldots \frac{1}{2}T''m]$ includes in the summation portions $+\frac{1}{2}T''m$, the calculations the system uses does not have to use $\frac{1}{2}$ of $T''m$ but may use the whole value $T''m$ for reasons of simplicity, since the error introduced would be negligible, as the values are compared by a ratio.

As the angle portion $\theta_{s1}$ advances thru the tightening excursion the area under the curve X–Y will increase at a uniform rate during the straight line portion of the curve X–Y, as would occur in an acceptable fastener assembly. If during this portion of the tightening sequence, should the area (work) increase at a lower or higher rate, this change in area (work) rate would then indicate departure from an acceptable fastener assembly. It is this change in area (work) rate the system uses to sense an unacceptable fastener assembly.

The area (work) above the base (To) for the angular displacement $\theta_{s1}$, is the sum of the combined areas of the rectangle ABDE and triangle BCD.

For each unit of angular advancement $\phi$ during the straight portion of curve X-4, the area of the triangle BCD will be equal to its predecessor.

Therefore the area (work) calculated in this straight line portion of the curve will be used as a reference, if it is within predetermined limits, from which to determine acceptability of the fastener assembly. When subsequent areas decrease, such would be an indication that less work was required to obtain additional rotation and, conversely, when subsequent areas increase, such would be an indication that more work was required to obtain additional rotation. While a straight line from B to C is used to illustrate the method of the invention, it should be apparent that the curve from B to C could be of any shape, as long as a constant abscissa is employed in each area measurement. In other words, $\theta$ should be the same value in each area measurement.

Figure 4:
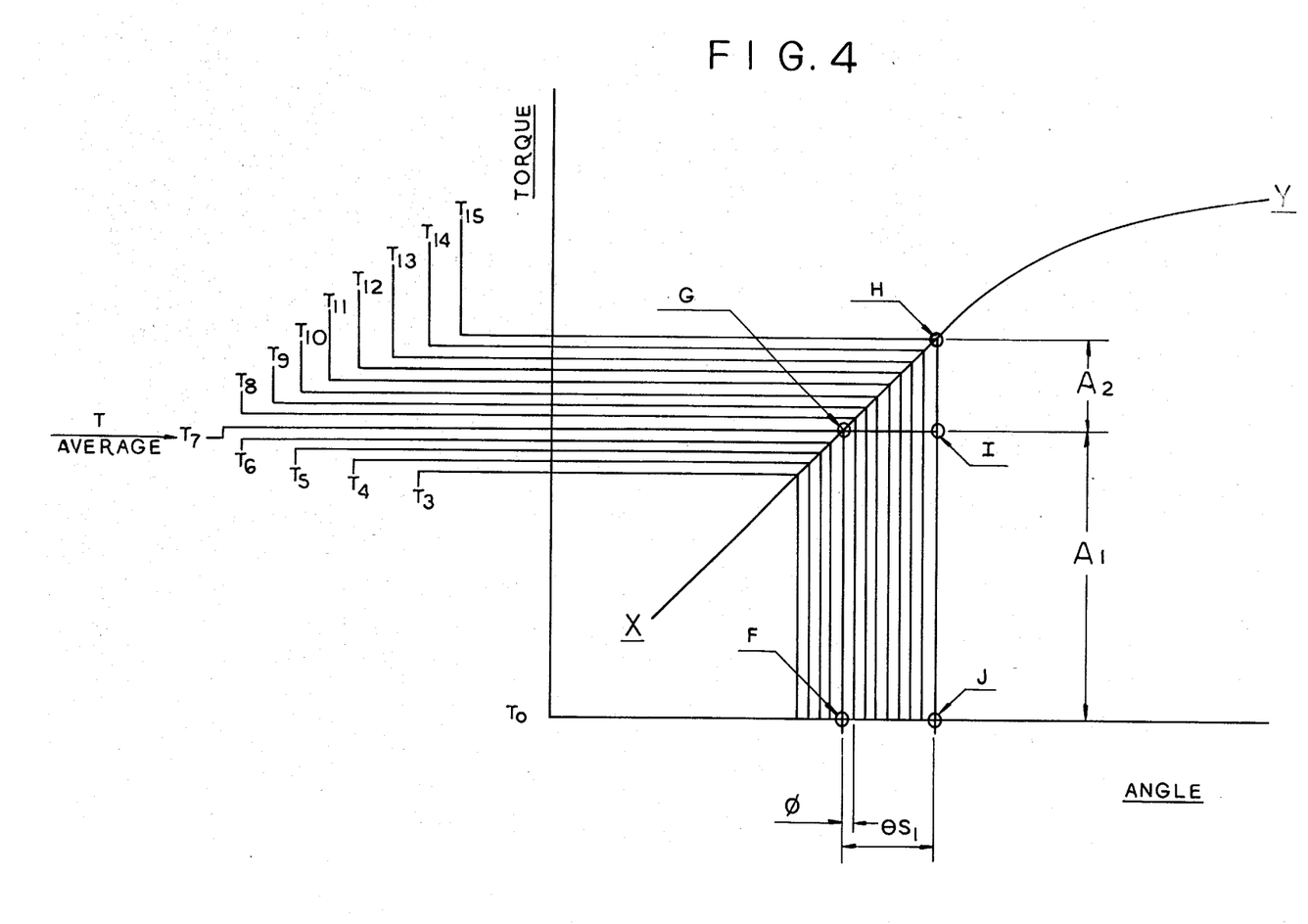

Referring now to FIG. 4, if $\theta_{s1}$ is advanced 4 units of displacement $\phi$, or $\frac{1}{2}\theta_{s1}$ (in the illustration $\theta_{s1} = 8$), along the curve XY, the area under this portion of the curve XY is expressed by the area of the polygon FGHJ. The areas can also be expressed by the sum of the combined areas of FGIJ and GHI. Note that the base line G-1 of triangle GHI corresponds with the level of "T" average of the previous calculation.

The area under the curve illustrated by GHI is used as the reference to determine whether a fastener assembly is being tightened within acceptable limits.

The analytic method of deriving this area will be presented.

For the present position of $\theta_{s1}$ the area of "$A_1$" can be expressed as:

$$A_1 = \text{"T" average } (\theta_{s1})$$

Substituting $$\sum_{4}^{11} T/\theta_{s1} \text{ for "T" average}$$

$$A_1 = \sum_{4}^{11} T/\theta_{s1} (\theta_{s1})$$

$$A_1 = \sum_{4}^{11} \frac{1}{4T}$$

Applying the formula from FIG. 3 to FIG. 4, the area FGHJ is the sum of torque values 8 thru 15

$$\text{or } A_1 + A_2 = \sum_{8}^{15} T.$$

The area of triangle $A_2$ can be calculated by:

$$A_2 = \sum_{8}^{15} T - A_1$$

Substituting $$\sum_{4}^{11} T \text{ for } A_1$$

$$A_2 = \sum_{8}^{15} T - \sum_{4}^{11} T$$

Referring now to FIG. 1, the first calculation of triangle area $A_L$ under the curve is retained and becomes the reference area $A_L$. As the cycle continues, for each displacement unit $\phi$, a new triangle area $A_L$ is calculated and compared to the retained reference $A_{L1}$.

Each new area calculation for angular advancement of $\phi$ ($A_L$) is compared to $A_{L1}$ by the quotient $A_L/A_{L1}$. The quotient remaining as unity would indicate no change in the work rate. A quotient greater than unity would indicate an increase in work rate. As stated previously, a change in the work rate beyond predetermined limits would indicate an unsatisfactory fastener assembly. Therefore, $A_L$ is calculated for each displacement unit $\phi$ and compared to $A_{L1}$ until the quotient $A_L/A_{L1}$ is <or> than predetermined values, if so a reject signal is set.

This process continues until the torque level exceeds set point $T_2$, a predetermined value for each specific fastener application.

This begins the high zone area (work) and rate change analysis portion of the cycle. The value of initial area $A_{H1}$ (work) is calculated and compared to predetermined limits set for each specific fastener application. If out of limits, a reject signal is set. If acceptable or not the cycle continues, and the initial area $A_{H1}$ (work) value is retained as a reference for the high sum area rate change comparison. As subsequent area value $A_H$ calculations are made, they are in turn compared to the reference area $A_{H1}$ (work), by the quotient $A_H/A_{H1}$ and if not within limits, a reject signal is set.

It is thus apparent that High Zone Area (work) calculation and comparison to the reference area (work) is done using the same analytical method as described in the Low Zone Area (work) rate change analysis description.

As a final check, the final torque and angular displacement values are compared to predetermined set points. T min., T max., and $\theta$ min. $\theta$ max. If final values are outside of these limits, a reject signal is set.

DESCRIPTION OF MEANS FOR UTILIZATION OF METHODS OF THE INVENTION

Figure 5A:
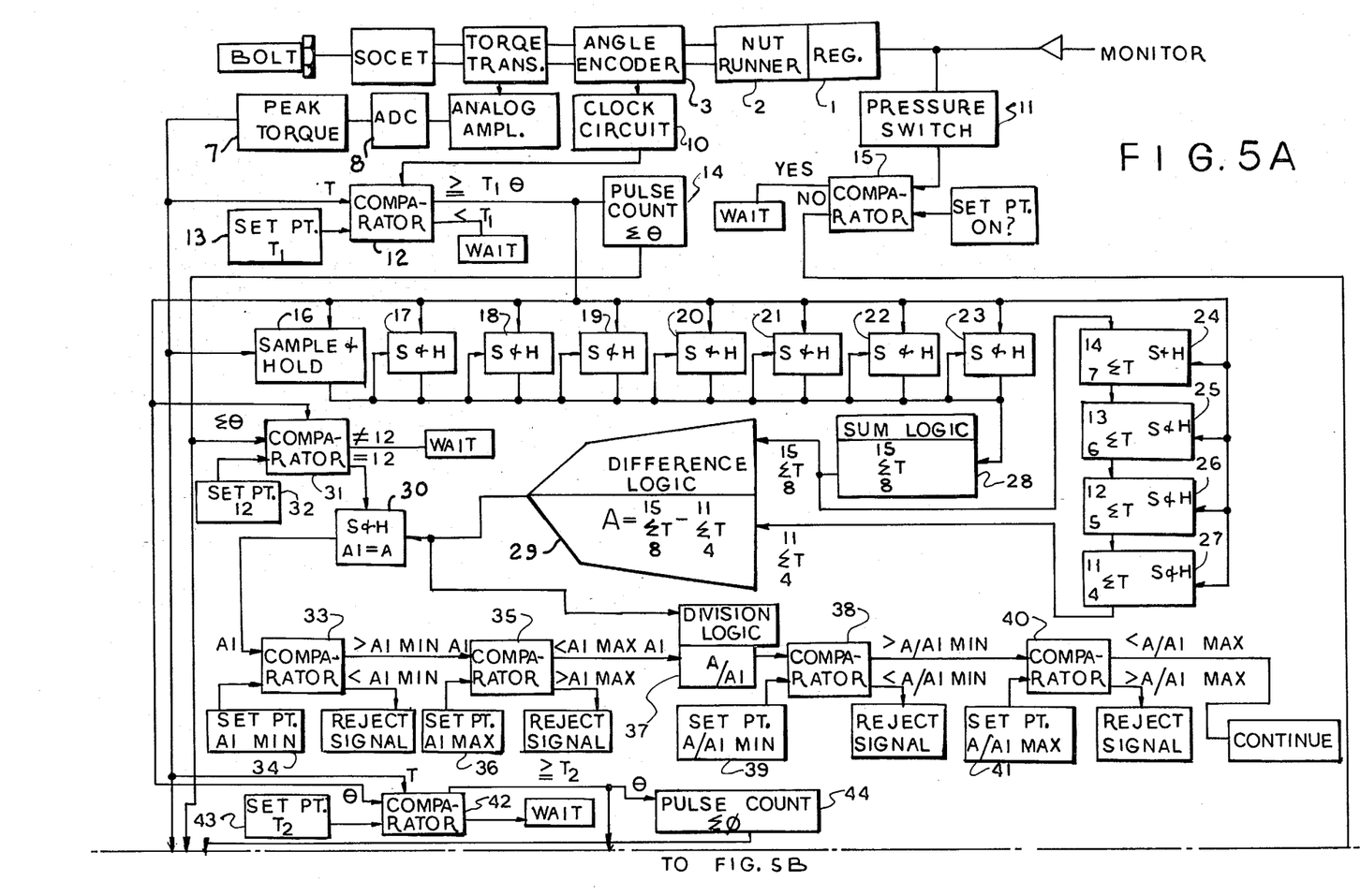
FIGS. 5A and 5B together comprise a block diagram of the preferred embodiment of the invention.
Figure 5B:
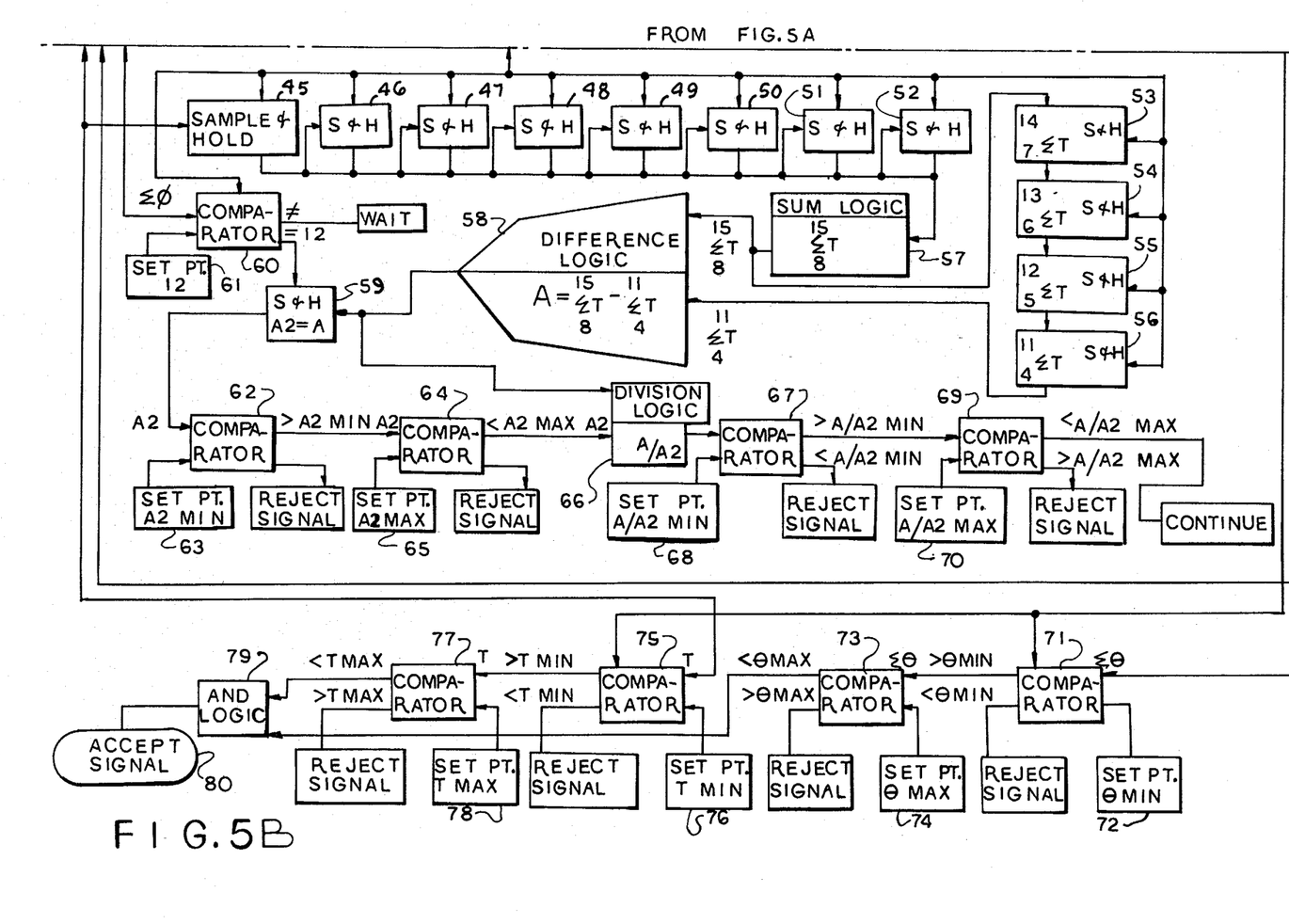

Referring to FIG. 5, air enters a nutrunner (2) thru a regulator (1) to cause a fastener (6) to be tightened to a torque level sufficient for an acceptable fastener assembly.

An angle encoder (3) drives a clock circuit (10) which gives one clock pulse per degree of fastener rotation or whatever degree setting is desirable depending on the specific fastener application. A torque transducer (4) gives an analog voltage signal that is proportional to the torque being applied to the fastener. This value is converted to a digital signal by an analog to digital converter (8). A peak torque element (7) holds the highest torque value that passes thru it per clock pulse. This torque value is fed to a comparator (12) where it is held until the torque value exceeds the set point $T_1$ (13).

When $T_1$ is exceeded, pulse count circuit (14) is actuated which begins to measure the angular displacement ($\Sigma\theta$). Comparator (12) also allows clock pulse (10) to pass to the (sample and hold) units (16) thru (23), after peak torque exceeds $T_1$.

Each clock pulse, after $T_1$ is exceeded, clocks all the (sample and hold) registers (16) thru (23). This action stores the most recent torque value in S and H (16) and moves the preceeding value that was in each of the S and H registers to the next S and H register. Therefore, the eight most recent torque values will be stored in registers (16) thru (23). The eighth most recent value will be in register (23) and the most recent value will be in register (16). The eighth most recent torque value in register (23) will be dropped when the next clock pulse moves the value from register (22) into register (23) and a new value will enter register (16).

Each clock pulse, after ($T_1$) was exceeded, also clocks each of the (S and H) registers (24) thru (27). The sum logic (28) continuously totals the torque values in S and H registers (16) thru (23). Each successive pulse stores the most recent value in sum logic (28), in S and H register (24) and moves the preceeding value that was in each of the S and H registers (24) thru (27) to the next register. Therefore, the four most recent sums of the torque values in registers (16) thru (23) are stored in S and H register (27) and the most recent sum is in register (24). The fourth most recent sum in register (27) will be dropped when the next clock pulse moves the value in register (26) to register (27) and a new value enters register (24).

Difference logic (29) continuously subtracts the value in S and H (27) from the value in sum logic (28). Twelve pulses after $T_1$ was exceeded, the sum of torque values 8 thru 15 (as shown in FIG. 3) is in sum logic (28) and the sum of torque values 4 thru 11 is in S and H register (27). Therefore, at this time clock pulse, the output of the difference logic (29) is the (sum of the torque values 8 thru 15) less (the sum of the torque values 4 thru 11). This value is the area "A." The output of the pulse count (14) now equals (12).

When the $\theta$ count equals 12, which is the value of set point (32), the clock pulse actuates S and H (30) storing the value of difference logic (29) at the 12th reading. This value is compared to set points (34) and (36) by comparators (33) and (35). If the value is between the set points, it proceeds to division logic (37) as reference area "$A_{L1}$." If it is not between the set points a reject signal occurs.

For each additional clock pulse, a new value for "$A_L$" will be divided by reference "$A_{L1}$" to determine a "change of rate of work" required to rotate the fastener. The quotient "$A_L/A_{L1}$" is compared to set points (39) and (41) by comparators (38) and (40). If the value is between the set points, the cycle continues, if not a reject signal occurs.

The nutrunner continues to tighten the fastener until the peak torque fed to comparator (42) exceeds set point $T_2$(43).

When $T_2$ is exceeded, pulse count circuit (44) is actuated which begins to measure the angular displacement $\phi$ after torque exceeded set point $T_2$ (43). Comparator (42) also allows clock pulse (10) to pass to the (sample and hold) registers (45) thru (52), after peak torque exceeds $T_2$.

Each clock pulse, after $T_2$ is exceeded, clocks all the (sample and hold) registers (45) thru (52). This action stores the most recent torque value in S and H (45) and moves the preceeding value that was in each of the sample and hold registers (45) thru (52) to the next S and H register. Therefore, the eight most recent torque values will be stored in registers (45) thru (52). The eight most recent value will be in register (52) and the most recent value will be in register (45). The most recent torque value in register (52) will be dropped when the next clock pulse moves the value from register (45) into register (46) and a new value will enter register (52).

Each clock pulse after ($T_2$) was exceeded, also clocks each of the (S and H) registers (53) thru (56). The sum logic (57) continuously totals the torque values in S and H registers (45) thru (52). Each successive pulse stores the most recent value in sum logic (57), in S and H register (53) and moves the preceeding values that was in each of the S and H registers (53) thru (56) to the next register. Therefore, the four most recent sums of the torque values in registers (45) thru (52) are stored in S and H register (56) and the most recent sum is in register (53). The fourth most recent sum in register (56) will be dropped when the next clock pulse moves the value in register (55) to register (56) and a new value enters register (53).

Difference logic (58) continuously subtracts the value in S and H (56) from the value in sum logic (57). Twelve pulses after $T_2$ was exceeded, the sum of torque values 8 thru 15 (as shown by FIG. 3) is in sum logic (57) and the sum of torque values (4) thru (11) is in S and H register (56). Therefore, at this clock pulse, the output of the difference logic (58) is the (sum of the torque values 8 thru 15) less (the sum of the torque values 4 thru 11). This value is the area "$A_{H1}$." The output of the pulse count (44) now equals (12).

When the $\phi$ count equals 12, which is the value of set point (61), the clock pulse actuates S and H (59) storing the value of difference logic (58) at the 12th reading. This value is compared to set points (63) and (65) by comparators (62) and (64). If the value is between the set points, it proceeds to division logic (66) as reference area "$A_{H1}$." If it is not between the set points a reject signal occurs.

For each additional clock pulse a new value for "$A_H$" will be divided by reference area "$A_{H1}$" to determine a "change of rate of work" required to rotate the fastener. The quotient $A_H/A_{H1}$ is compared to set points (68) and (70) of comparators (67) and (69). If the value is between the set points the cycle continues, if not a reject signal occurs.

The nutrunner (2) continues to tighten the fastener until the tool is shut off by the operator or other control means. The shutoff signal is obtained from a pressure switch (11) connected to a controlled air line of the nutrunner (2).

This signal is compared to the "on" set point of comparator (15); if "off" an output pulse is directed to comparator (71). This pulse allows the comparison of pulse count (14) to the set point (72); if greater than the set point a reject signal occurs. If less than the set point, the value of pulse count (14) is compared to set point (74) of comparator (73). If greater than the set point a reject signal occurs. If less than the set point a signal if fed to "AND" logic (79). The output pulse of comparator (15) is also directed to comparator (75) to allow the final torque to be compared to set point (76). If less than set point a reject signal occurs. If greater than set point the final torque is compared to set point (78) of comparator (77).

If greater than set point (78) a reject signal occurs. If less than set point a signal is directed to "AND" logic (79). When signals from both the pulse count (14) comparison and the final torque comparison are present at "AND" logic (79) an accept signal occurs and the monitor cycle terminates.

What is claimed is:

1. A method for monitoring a fastener assembly operation to determine if the operation meets predetermined standards, comprising the steps of applying torque to a fastener to rotate it a predetermined amount, calculating a base area under the resulting torque-angle curve thus generated, continuing application of torque to the fastener until another identical rotation amount is achieved, calculating the area under the subsequent torque-angle curve, establishing a quotient by dividing the value of the subsequent torque-angle curve area by the value of the torque-angle curve base area, comparing the quotient with a pre-established quotient range, and signalling if the quotient is not within the pre-established quotient range.

2. A method according to claim 1, wherein successive areas are calculated for each subsequent torque-angle curve generated by the same degree of fastener rotation, combining the value of said subsequent torque-angle curve areas, establishing a quotient by dividing the value of said subsequent torque-angle curve areas by the value of the torque-angle curve base area, comparing the quotient with a pre-established quotient range, and signalling if the quotient is not within the pre-establishd quotient range.

3. A method according to claim 2, wherein a new base area is calculated when the applied torque reaches a pre-determined value, and repeating the steps of the method as set forth in claims 5 and 6.

4. A method according to claim 3, wherein the fastener is rotated one degree for each calculation of torque-angle curve area.

5. Apparatus for monitoring a fastener assembly operation to determine if the operations meets pre-determined standards comprising, a tool for applying torque to a fastener means for measuring the value of torque being applied to the fastener, means for measuring the degree of rotation of the fastener as a result of applied torque thereto, means for calculating a base area under a torque-angle curve as indicated by the torque and angular measurements, means for calculating the area under a subsequent torque-angle curve made during another identical fastener rotation amount, means for calculating a quotient by dividing the area of the subsequent torque-angle curve by the area of the base area of the initial torque-angle curve, means for comparing the quotient with a pre-established quotient range, and means for signaling if the quotient is not within the pre-established quotient range.

* * * * *